United States Patent [19]

Corbisello

[11] Patent Number: 4,541,601
[45] Date of Patent: Sep. 17, 1985

[54] TREE STAND

[76] Inventor: Rocco J. Corbisello, R.D. #7, Cleland Mill Rd., Box 193C, New Castle, Pa. 16102

[21] Appl. No.: 573,335

[22] Filed: Jan. 24, 1984

[51] Int. Cl.⁴ ............................................. F16M 13/00
[52] U.S. Cl. ...................................... 248/516; 248/527
[58] Field of Search .............. 248/516, 523, 524, 525, 248/526, 527, 514, 515, 225.1; 47/40.5

[56] References Cited

U.S. PATENT DOCUMENTS

| | | | |
|---|---|---|---|
| 649,785 | 5/1900 | Weinert | 248/524 |
| 2,292,505 | 8/1942 | Black | 248/524 |
| 2,504,455 | 4/1950 | Ruetz | 248/524 X |
| 2,605,067 | 7/1952 | Lindsell | 248/527 X |
| 2,746,700 | 5/1956 | Barbera | 248/523 X |
| 2,933,274 | 4/1960 | Mausolf | 248/524 X |
| 3,007,664 | 11/1961 | Fairbanks | 248/DIG. 7 |
| 3,040,636 | 6/1962 | Gregoire et al. | 248/516 X |
| 3,142,464 | 7/1964 | Zelenitz | 248/516 X |
| 3,231,227 | 1/1966 | Weining | 248/516 X |
| 3,298,642 | 1/1967 | Taylor | 248/524 X |
| 3,648,957 | 3/1972 | Bencriscutto | 248/523 X |
| 4,320,886 | 3/1982 | Stodola | 248/523 |
| 4,412,478 | 11/1983 | Osher | 248/225.1 X |

Primary Examiner—J. Franklin Foss
Attorney, Agent, or Firm—Burns, Doane, Swecker & Mathis

[57] ABSTRACT

A tree stand is disclosed which may support an artificial or real tree either on a horizontal surface or attached to a wall. A universally mounted ball accepts the trunk of the tree and allows the tree to be oriented in any direction. Various forms of locking devices are disclosed to retain the tree and ball in their desired orientation.

28 Claims, 16 Drawing Figures

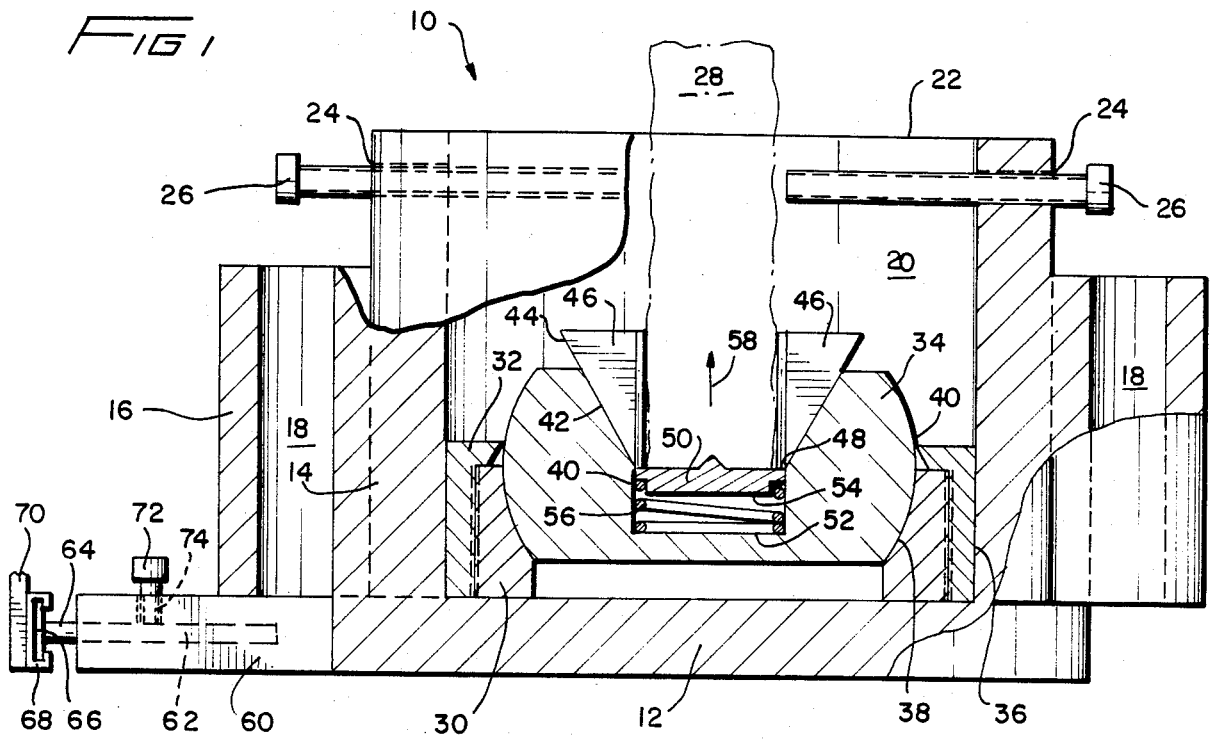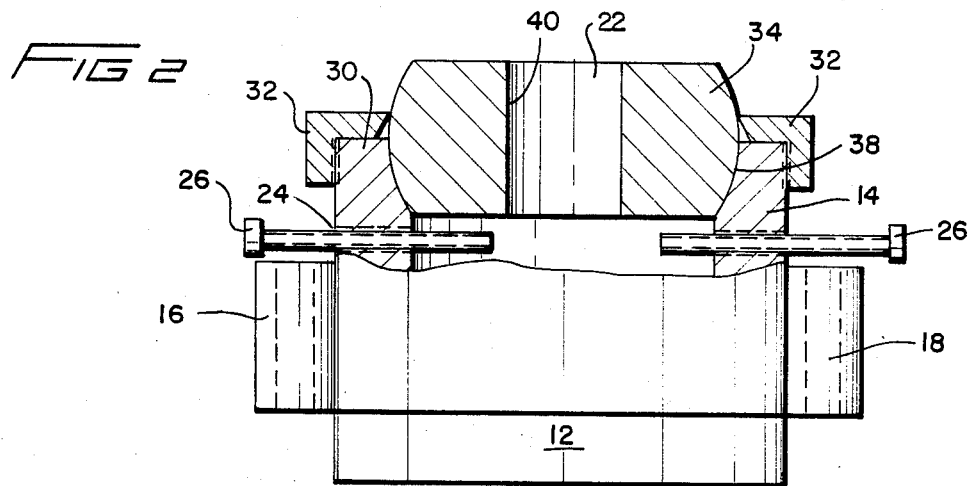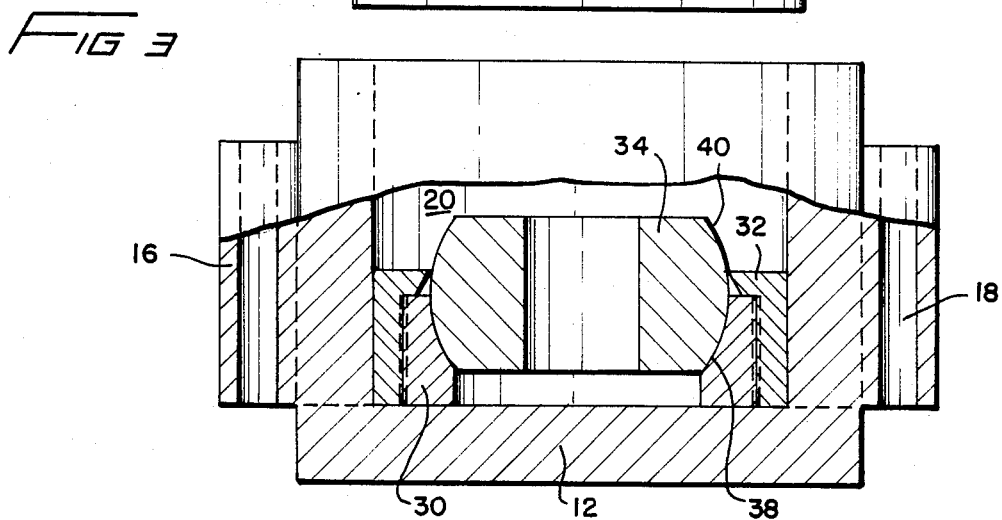

TREE STAND

BACKGROUND OF THE INVENTION

The present invention relates to a stand for supporting a tree. The tree may be of the artificial type or may be a tree which has been cut to be placed in the tree stand.

SUMMARY OF THE INVENTION

The present invention relates to a stand which is adapted to support a tree inserted therein. The stand includes a rotatable element received in an opening in the stand and adapted to receive a trunk portion of the tree. The rotatable element is provided with a seat so as to support the element for rotation in three directions of movement, i.e., roll, pitch and yawl axes. Additionally, a locking means is provided with the ball element so as to securely receive, in the ball element, a trunk portion of the tree. The locking means operates by utilizing the weight of the tree to compress a vertically movable element and wedge means associated with the vertically movable element. Upon the weight of the tree being distributed on the disc element, the wedge means are brought to a more closed position so as to securely grasp the trunk portion of the tree which is inserted therein. The disc element is biased by a spring means to an open position in the absence of the weight of a tree inserted thereon. The base portion of the tree stand is provided with a device for securing the stand to a supporting side wall of the structure in which the tree is to be housed. The device includes an extendable element, housed in a base portion extension, for allowing the tree stand to be placed at various, indeterminate lengths from the side wall of such structure. Once the distance from the side wall of the structure is established, the device includes an extendable element which is adapted to be received in a bracket secured to the side wall. A set screw is provided so as to securely lock the extendable element in place and prevent movement of the tree stand. Various configurations of the rotatable ball element and disc element are included in the specification.

BRIEF DESCRIPTION OF THE DRAWINGS

FIG. 1 is a side view, partly in cross-section, of the tree stand of the present invention;

FIG. 2 is a partial view of the tree stand, in partial cross-section, incorporating a second embodiment of the location of the rotatable element;

FIG. 3 is a partial view of the tree stand, in partial cross-section, showing a third embodiment of the rotatable element and supporting seat structure;

FIG. 5b is a further embodiment of the seat structure for the ball element shown in FIG. 5a;

DETAILED DESCRIPTION OF THE PREFERRED EMBODIMENTS

Figure 4:
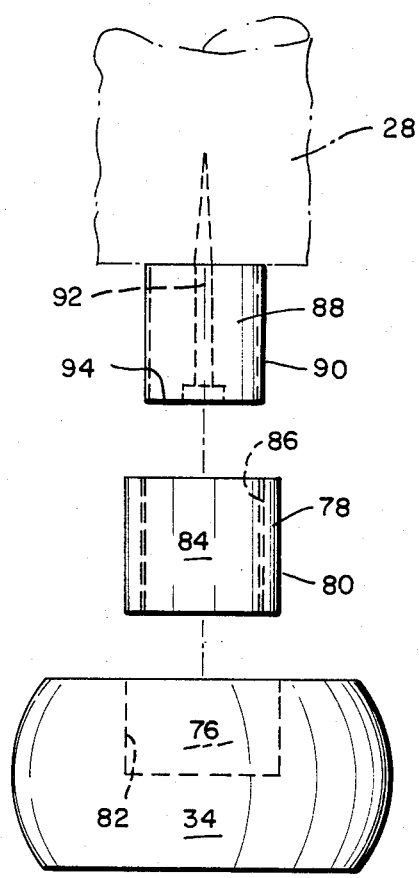
FIG. 4 is an exploded schematic view of an embodiment of the ball element which includes additional support means for supporting a trunk portion of a tree.

The tree stand is indicated generally at reference numeral 10 in FIG. 1. The stand is provided with a base section 12 and a vertically extending side wall portion 14. The side wall portion 14 includes a concentric, integral section 16 which is provided with vertically extending openings 18 therethrough. The openings are designed for legs (not shown) to be attached if necessary to give further support for the support base. The vertically extending side walls 14 define an interior area 20 with a top opening 22. The vertically extending side walls 14 are provided with openings 24, two of which are shown in FIG. 1, to receive fastening means 26 therethrough. The fastening means acts to align a trunk portion of a tree, shown schematically at 28, with respect to the vertically extending side walls 14 of the tree stand 10. Positioned in the bottom portion of the interior area 20 is a two-piece seat means indicated at 30 and 32. The seat means acts to support and position a rotatable ball element 34 within the interior area 20 of the tree stand 10. While not shown, it is also contemplated that the two-piece seat 30 and 32 could be provided with screw threads so as to be threadedly engaged with one another and with the interior wall portion 36 of the vertically extending side walls 14. The ball element 34 is seated in the seat elements 30 and 32 and is supported therein for motion along its roll, pitch and yawl axis. Accordingly, the ball element 34 provides three directions of movement with respect to the fixedly positioned tree stand 10. The three directions of movement are obtained by the sliding faces at the intersection of the ball element 34 and the seat elements 30 and 32. This movement occurs at the interface of interior facing seat portion 38 of the seat element 30 and the exterior face 40 of the ball element 34.

The ball element 34 is provided with a centrally located interior opening 40. Vertically spaced above the interior opening 40 are diverging sidewalls 42 for cooperating with end faces 44 of wedge means 46. The side faces 44 of the wedge means 46 are adapted to slide diagonally against the faces 42 of the ball element 34. The wedge means 46 are provided with a bottom end portion 48 which contacts a disc element 50. The disc element 50 is adapted to slide in the opening 40 defined in the ball element 34. Positioned between an interior bottom wall 52, of the opening 40, and the interior bottom wall 54, of the disc element 50, is a spring 56. The spring 56 acts to bias the disc element 50 in the direction of arrow 58. The wedge means 46 ride, as previously described, along the faces 42 and are carried by the contact of end faces 48 so as to be biased to the maximum open diameter obtainable by the spring 56 when the disc element 50 is biased to its maximum upward extent. An extension leg 60 may also be provided in conjunction with the support base 12 of the tree stand. The extension leg 60 is provided with a hollow recess 62 which receives therein an extensible element 64. The element 64 is provided with a head 66 which is adapted to be received in a bracket 68. The bracket 68 may be affixed to a side wall 70 of a building or other static structure so as to provide a steady support for the tree stand 10. The extensible element 64 may be fixedly secured to the tree stand 10 by the use of a set screw 72. The set screw 72 is received in an opening 74 and contacts the extensible element 64 so as to secure the element 64 to the extension 60 of the tree stand 10.

FIG. 2 is an alternative embodiment to that shown in FIG. 1. The like elements are numbered the same as in FIG. 1 and function in the same manner as explained in FIG. 1. In this embodiment, the ball element 34 is located at the opening 22 of the stand 10. The vertically extending side wall 14 integrally forms a seat face 38 and the seat element 32 may be threadedly engaged with the seat element 30 formed by the upper end portion 30 of the vertically extending side wall 14. In this embodiment, the ball element is located vertically above the alignment means 26 located in the openings 24 of the side wall 14.

FIG. 3 is a second embodiment of the device shown in FIG. 1 and is similar to the device shown in FIG. 2 with the exception that the ball element 34 and seat means 30 and 32 are located in the base of the stand 10 at the bottom of the interior open area 20. The side faces 38 and 40, of the seat 30 and ball element 34 cooperate in the same manner as explained previously. In this embodiment, as in FIG. 2, there is no use made of the wedge means 46, disc element 50 and spring means 52 shown in FIG. 1.

FIG. 4 is an alternative embodiment in which the ball element 34 is modified. It is to be recognized that the ball element 34, shown in FIG. 4, could be utilized in the tree stands 10 shown in FIGS. 1 through 3. In the embodiment of FIG. 4, the ball element 34 is provided with an opening 76 so as to receive a sleeve 78 therein. The sleeve 78 is provided with exterior, smooth side walls 80 which are designed to fit smoothly along the interior side walls 82 of the opening 76. The sleeve 78 is provided with an interior opening 84 and internally threaded side walls 86. The sleeve 78 receives therein a collar 88 which is provided with externally threaded side walls 90. A spike device 92 is affixed to the internal bottom wall 94 of the collar 88.

In use, the collar 88 and spike 92 are fixedly secured to the tree 28 by driving the spike 92 into the trunk portion of the tree. The sleeve 80 is then threadedly engaged by mating threads 86 and 90 to the collar 88. The assembly is then inserted into the opening 76 along interior side walls 82 of the ball element 34.

Figure 5A:
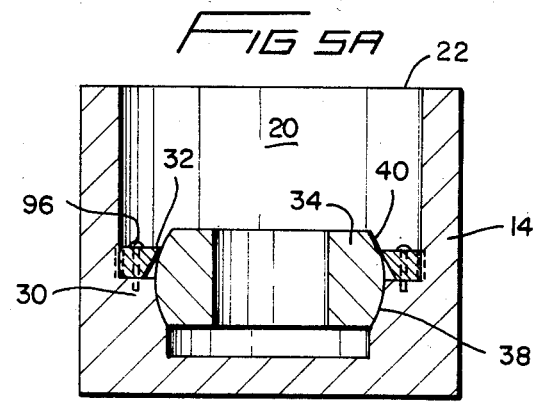
FIG. 5a is a sectional view of a portion of the tree stand, including the ball element and an embodiment of the seating structure for the ball element.
Figure 5B:
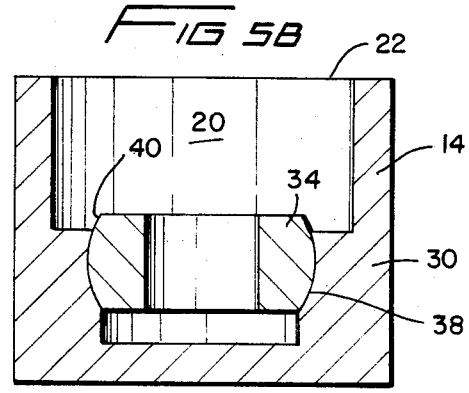

FIGS. 5a and 5b are further embodiments of the ball and seat arrangement shown in FIGS. 1 through 3. Accordingly, corresponding reference numerals are utilized to indicate identical elements and parts and only the additional or changed elements are identified by new reference numerals. FIG. 5a discloses an embodiment in which the ball element 34 is again provided with a two-piece seat arrangement 30 and 32. However, the seat element 32 is provided with a pin arrangement to hold it to the seat element 30 which is formed integrally with the vertically extending side wall portion 14. Of course, the integral seat face 38, of seat element 30, is also an integral portion of the vertically extending side wall section of the stand 10.

FIG. 5b is an additional embodiment in which the seat is formed of one piece 30 which is an inward extension of the upwardly extending side wall 14. Of course, the faces 38, of the seat 30 and face 40 of the ball element 34 cooperate in the same manner as previously described.

Figure 6A:
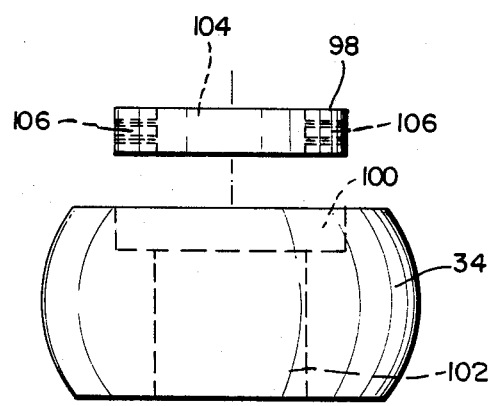
FIG. 6a is a further embodiment of the ball element shown in FIG. 4 and includes an integral collar section for supporting a portion of the tree trunk inserted therein.

FIG. 6a is another embodiment of the ball element 34 which is somewhat similar to the embodiment of FIG. 4. In this embodiment, the ball element 34 is provided with an enlarged opening 100 which is concentric with a smaller diameter opening 102 which extends throughout the length of the ball element 34. A sleeve 98 is provided and is adapted to be inserted into the ball element 34. The sleeve 98 is provided with an interior opening 104 for receiving the trunk portion 28 of a tree. The sleeve element 98 is provided with axially extending openings 106 for receipt therein of fastening means (not shown) for grasping and securing to the sleeve 98 the trunk 28 of the tree. In this embodiment, of course, the fastening and aligning means 26, as shown in FIGS. 1 and 2, may or may not be used in combination with the fastening and aligning means that would be utilized in the openings 106.

Once the sleeve 98 is fitted onto the trunk of the tree and securely fastened thereto by the fastening means through openings 106, the sleeve is then positioned in the opening 100 of the ball 34.

Figure 6B:
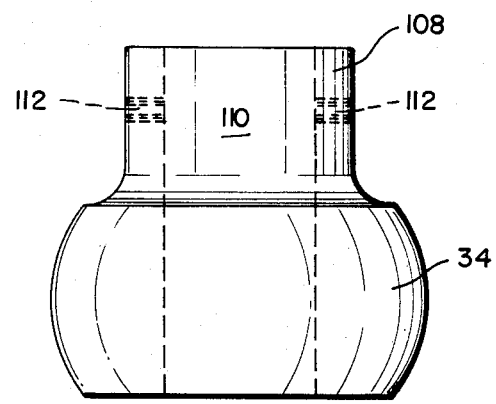
FIG. 6b is a further embodiment of the ball element shown in FIG. 4.

FIG. 6b is another embodiment similar to FIG. 6a in which the ball element 34 is provided with an integral, upstanding portion 108. The ball element and its integral portion 108 are provided with an opening 110 through the extent of the interior of the body. This is to accommodate the trunk 28 of the tree. In a fashion similar to that shown in FIG. 6a, the integral portion 108 is provided with axially extending openings 112 for receipt therethrough of fastening and aligning means (not shown). The fastening and aligning means which are not shown would be used to contact and hold the trunk portion 28 of the tree with respect to the ball element 34.

Figure 7A:
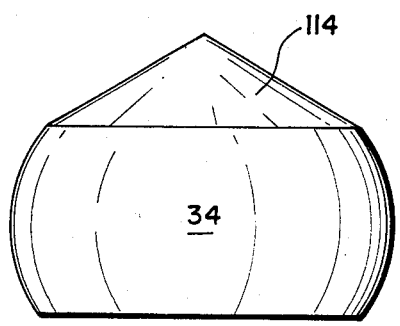
FIGS. 7a, 7b, 7c and 7d are four different embodiments of the ball element provided with different structures for supporting a trunk portion of the tree therein; and, FIGS. 8a, 8b, 8c and 8d are four different embodiments of the disc element positioned in the ball element of FIG. 1 and spring means associated therewith so as to bias the disc element against a trunk portion of the tree inserted in the ball element of FIG. 1.
Figure 7B:
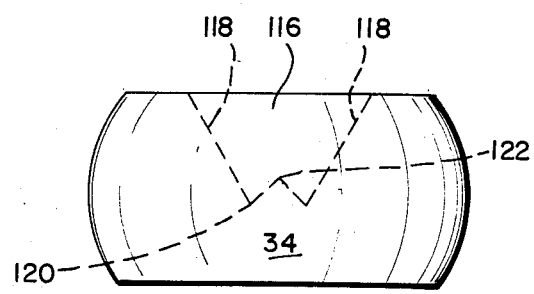

FIGS. 7a, 7b, 7c and 7d show four embodiments of the ball element 34 which are configured so as to grasp or secure the ball element 34 to the trunk portion 28 of the tree. In the first embodiment, the ball element is provided with an integral spike portion 114 which functions as the previously discussed spike portions 92. In this case, there is no need for an opening to be provided in the ball element since the spike portion 114 will be inserted into the trunk of the tree for supporting the trunk 28 with respect to the ball element 34. In the embodiment of FIG. 7b, a partial opening 116 is provided in the ball element 34. In this example, the opening does not extend throughout the length of the ball element 34 but is formed with sloping side walls 118 which are configured so as to extend to a maximum depth 120 and then rise in a reverse slope so as to form a spike 122. In this manner, the trunk portion 28, of the tree, not only receives the spike portion 122 but is also wedged into the openings 116 by the converging side walls 118.

Figure 7C:
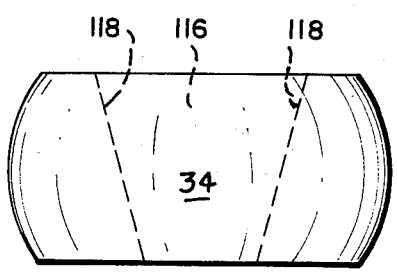

FIG. 7c is somewhat similar to that shown in FIG. 7b. However, the opening 116 extends throughout the length of the ball 34. Accordingly, no spike means are utilized in this embodiment. The sloping side walls 118 extend along the entire length so as to accommodate different size tree trunks 28 along the continually narrowing opening 116 due to the converging side walls 118.

Figure 7D:
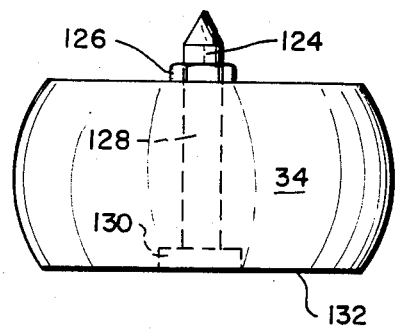

The embodiment of FIG. 7d is somewhat similar to the embodiment of FIG. 7a. The ball element 34 is provided with a spike means 124 which is separate and apart from the ball element 34. The spike means 124 is fixedly secured to the ball element 34 by a locking nut arrangement at 126. In the embodiment shown, the shaft 128, of the spike 124, extends throughout the length of the ball element 34 with the head 130 of the spike 124 flush with the exterior bottom wall 132 of the ball element 34.

Figure 8A:
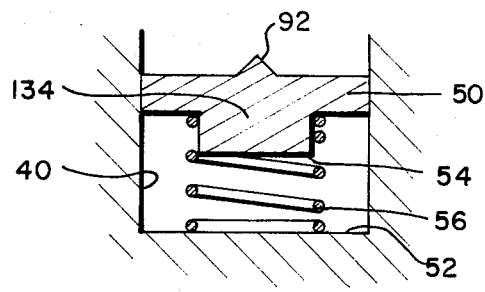
Figure 8B:
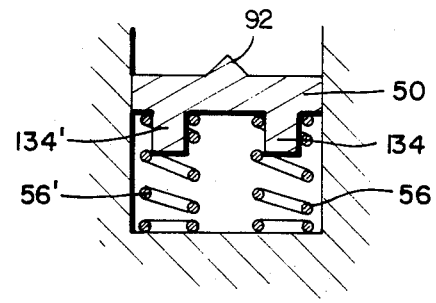
Figure 8C:
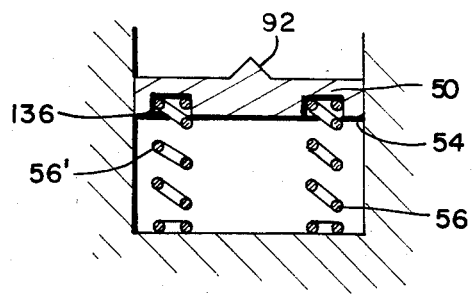
Figure 8D:
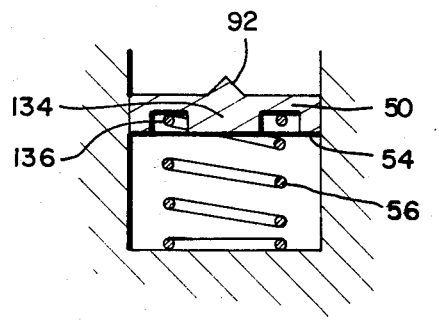

In FIG. 8a, the disc element 50, shown in FIG. 1, is shown in greater detail and in a somewhat different embodiment. In this embodiment, a projection 134 is provided on the disc and extends towards the internal bottom wall 52 of the ball element. A spring 56 biases the disc element 50 toward its uppermost position and the disc 50 is slidably received within the side walls 40 of the ball element 34. In this embodiment, the spring 56 is concentric with respect to the projection 134 of the disc element 50. FIG. 8d shows a somewhat similar embodiment in that a single spring 56 is utilized. However, in this embodiment, a projection does not extend from the disc but a slot 136 is provided in the disc at a diameter smaller than the diametrical extent of the disc element 50. Accordingly, a projection 134 does not extend beneath the extent of the bottom wall 54 of the disc element 50. Accordingly, the spring 56 is concentric with the area defined within the slot 136. FIG. 8b discloses the use of two springs 56 and 56'. In this embodiment, a projection 134 and 134' is provided for each spring 56 and 56', respectively. The springs 56 and 56' are concentric with respect to the projections 134 and 134', respectively. FIG. 8c discloses an embodiment similar to that shown in FIG. 8b and again utilizes dual springs 56 and 56'. In this embodiment, the springs are received in openings 136 provided in the disc element 50 in the same manner as that shown in FIG. 8d.

What is claimed is:

1. A tree stand for supporting a tree comprising:
   a support base;
   a side wall vertically extending from said support base so as to define an interior area;
   a plurality of openings in said side wall which receive means for aligning said tree with said side wall;
   a ball element provided substantially interiorly of said side wall and including an opening therein which receives a trunk portion of said tree;
   spring means positioned in said ball element opening between a bottom end wall of said opening and an interior bottom wall of a disc element positioned in said opening;
   seat means supporting said ball element and adjustably positioning said tree for movement in three directions.

2. The tree stand of claim 1, wherein said three directions are roll, pitch and yaw movements.

3. The tree stand of claim 2 wherein said seat is a two-piece seat.

4. The tree stand of claim 2 wherein said seat is positioned interiorly of said side wall.

5. The tree stand of claim 2 wherein said seat includes a portion of said side wall.

6. The tree stand of claim 3 wherein one element of said two-piece seat is exterior of said side wall.

7. The tree stand of claim 2 wherein said ball element includes wedge means slidably positioned in said ball element opening so as to grip said trunk portion of said tree.

8. The tree stand of claim 7 wherein said wedge means are biased by spring means to a maximum open position.

9. The tree stand of claim 8 wherein said wedge means contact said disc element and are biased to an open position, under the influence of said spring means, so as to receive said trunk portion of said tree along interior side walls of said wedge means.

10. The tree stand of claim 8 wherein said wedge means includes sloping wall portions opposite said interior side walls and in sliding relationship to inwardly facing sloping side wall portions of said ball element so as to allow said wedge means to contact and grip said trunk portion of said tree when said trunk portion compresses said spring means.

11. The tree stand of claim 3 wherein said two-piece seat is provided with interengaging thread means so as to fixedly secure said means to said side wall.

12. The tree stand of claim 1 wherein said disc element includes a spike means positioned on a side of said disc opposite said spring means for engagement with said trunk portion of said tree.

13. The tree stand of claim 12 wherein said spike means is provided integrally with said ball element at an interior portion thereof.

14. The tree stand of claim 12 wherein said spike means is provided integrally with said ball element at an exterior portion thereof.

15. The tree stand of claim 12 wherein said spike means is fixedly secured to said ball element.

16. The tree stand of claim 1 wherein said spring means is a single spring positioned between said bottom end wall and said disc element and concentric with a projection extending from said interior bottom wall of said disc element.

17. The tree stand of claim 1 wherein said spring means comprises plural springs positioned between said bottom end wall and said disc element with individual springs concentric with plural projections extending from said interior bottom wall of said disc element.

18. The tree stand of claim 16 wherein one end of said spring means is positioned in a recess concentric with said projection.

19. The tree stand of claim 17 wherein one end of each of said plural springs is positioned in a recess.

20. The tree stand of claim 1, wherein said base includes an extension leg and attachment means for connection of said extension leg to a supporting side wall.

21. The tree stand of claim 20 wherein said extension leg includes an extension element axially adjustably positioned in said extension leg.

22. The tree stand of claim 21 wherein said extension leg is provided with a set screw so as to fixedly position said extension element with respect to said extension leg in any of said axially adjusted positions.

23. The tree stand of claim 20 wherein said attachment means includes an enlarged head integral with said extension element and a bracket means attached to said supporting side wall for receiving said head therein.

24. The tree stand of claim 3 wherein said two-piece seat is fixedly secured together by fastening means inserted therethrough.

25. The tree stand of claim 1 wherein said ball element includes a sleeve positioned in said opening and provided with internal screw threads and further including a collar member provided with external screw threads and spike means for engaging a trunk portion of said tree, said internal and external screw threads interengaging so as to support said tree in said ball element.

26. The tree stand of claim 1 wherein said ball element includes a sleeve means provided with an internal opening, the diameter of said opening varied by adjustable screw means so as to engage varying diameter trunk portions of said tree; said sleeve means positioned in said opening of said ball element.

27. The tree stand of claim 1 wherein said ball element includes an integral collar section which extends in a direction so as to receive therein a longer section of a trunk portion of said tree.

28. The tree stand of claim 1 wherein said side wall includes an integral portion concentric with said interior area, said integral portion including openings extending vertically therethrough so as to receive leg means for insertion in said openings and support of said base.

* * * * *